US011517862B2

(12) United States Patent
Chien et al.

(10) Patent No.: US 11,517,862 B2
(45) Date of Patent: Dec. 6, 2022

(54) FLUID MISING ASSEMBLY

(71) Applicant: TRUSVAL TECHNOLOGY CO., LTD., Zhunan Township (TW)

(72) Inventors: Shih-Pao Chien, Zhunan Township (TW); Yao-Tai Yang, Zhunan Township (TW)

(73) Assignee: TRUSVAL TECHNOLOGY CO., LTD., Zhunan Township (TW)

( * ) Notice: Subject to any disclaimer, the term of this patent is extended or adjusted under 35 U.S.C. 154(b) by 200 days.

(21) Appl. No.: 17/036,549

(22) Filed: Sep. 29, 2020

(65) Prior Publication Data

US 2022/0097009 A1 Mar. 31, 2022

(51) Int. Cl.
*B01F 25/30* (2022.01)
*B01F 23/40* (2022.01)
(Continued)

(52) U.S. Cl.
CPC .............. *B01F 25/30* (2022.01); *B01F 23/40* (2022.01); *B01F 23/483* (2022.01); *B01F 25/10* (2022.01); *B01F 35/80* (2022.01); *B01F 23/451* (2022.01); *B01F 25/3131* (2022.01); *B01F 25/4334* (2022.01)

(58) Field of Classification Search
CPC ........ B01F 25/30; B01F 23/483; B01F 25/10; B01F 25/3131; B01F 25/4334; B01F 23/451; B01F 25/31242; B01F 2025/93
See application file for complete search history.

(56) References Cited

U.S. PATENT DOCUMENTS 1,878,478 A * 9/1932 Ensign .................... F23D 14/48 137/893
2,357,266 A * 8/1944 Malcolm ............... B01F 25/312 208/299

(Continued)

FOREIGN PATENT DOCUMENTS

CN 1218767 A 6/1999
CN 2786411 Y 6/2006

(Continued)

OTHER PUBLICATIONS

English abstract for CN201389431, Total of 1 page.

(Continued)

*Primary Examiner* — Matthew W Jellett
*Assistant Examiner* — Christopher D Ballman
(74) *Attorney, Agent, or Firm* — Apex Juris, PLLC; R. Lynette Wylie; Tracy Heims

(57) ABSTRACT

A fluid mixing assembly includes a connecting cap, a three-way pipe and a connecting member; the connecting cap has a first connecting portion; the three-way pipe is connected to the connecting cap, and has a second connecting portion, an output portion and a cavity, wherein the second connecting portion, the output portion and the cavity communicate with each other; the connecting member is connected to the connecting cap, and has a pin-hole channel, wherein the pin-hole channel has a first end bore and a second end bore opposite to the first end bore, the first end bore communicates with the first connecting portion, and the second end bore communicates with the second connecting portion and the output portion.

11 Claims, 9 Drawing Sheets

(51) Int. Cl.

| | |
|---|---|
| ***B01F 35/80*** | (2022.01) |
| ***B01F 25/10*** | (2022.01) |
| *B01F 25/313* | (2022.01) |
| *B01F 23/451* | (2022.01) |
| *B01F 25/433* | (2022.01) |

(56) References Cited

U.S. PATENT DOCUMENTS 2,423,801 A * 7/1947 Sloan .................... E21B 21/062 138/44
2,569,857 A * 10/1951 Jaegle ............... B01F 25/31242 248/89
3,379,375 A * 4/1968 Walkling .................. F23Q 9/00 239/110
3,716,346 A * 2/1973 Greene ..................... C01B 7/01 137/7
4,106,111 A * 8/1978 Rose ................. B01F 25/31242 366/124
4,416,610 A * 11/1983 Gallagher, Jr. ....... B01F 25/312 137/888
4,483,805 A * 11/1984 Glindsjo .............. B01D 53/501 261/78.2
4,615,352 A * 10/1986 Gibot ...................... B22C 9/123 137/892
4,634,560 A * 1/1987 Eckert ................... B01F 25/312 261/78.2
4,738,614 A * 4/1988 Snyder .................. F23D 11/104 239/433
4,885,084 A * 12/1989 Doyle ................... C02F 3/1294 261/DIG. 39
4,913,192 A * 4/1990 Vavra .................... B01F 25/312 137/895
4,993,495 A * 2/1991 Burchert ................. B01F 25/31 261/DIG. 26
5,016,817 A * 5/1991 Ghate ............... B01F 35/71745 239/113
5,301,718 A * 4/1994 Bolhofner ............... B01F 25/31 137/526
5,311,907 A * 5/1994 Houck ...................... F15C 1/16 137/892
5,335,686 A * 8/1994 Isringhausen ............. F16T 1/34 137/883
5,398,712 A * 3/1995 Wang .................... B08B 9/0328 137/240
5,403,522 A * 4/1995 Von Berg .......... B01F 25/31242 261/36.1
5,409,310 A * 4/1995 Owczarz ................. B01F 23/49 366/160.5
5,427,151 A * 6/1995 Pauley .............. B01F 25/31242 417/189
5,816,446 A 10/1998 Steindorf et al.
6,157,774 A * 12/2000 Komino .................. B01F 35/93 392/387
6,162,021 A * 12/2000 Sarshar ................... E21B 43/00 417/174
6,682,057 B2 * 1/2004 La Crosse ............. B01F 25/312 261/76
6,986,506 B2 * 1/2006 Chapman .......... B01F 25/31242 261/76
6,994,276 B2 * 2/2006 Faye ................. H01M 8/04007 239/421
7,156,377 B2 * 1/2007 Chapman ............ B01F 25/3121 96/204
8,251,571 B2 * 8/2012 Imai ...................... B01F 23/451 366/165.2
8,573,243 B2 * 11/2013 Burnham .......... B01F 25/31242 137/317
8,591,095 B2 * 11/2013 Fanjat .................. G05D 11/138 366/132
8,807,158 B2 * 8/2014 Harris ..................... B01F 35/56 285/294.1
9,676,291 B2 * 6/2017 Haussmann ....... B60H 1/00278
9,931,601 B2 * 4/2018 Engelhard ........... B01F 23/2323
10,300,501 B2 * 5/2019 Morerod ............... B01F 25/231
10,302,224 B2 * 5/2019 Kluz ....................... F16K 47/08
10,420,924 B2 * 9/2019 Bolz ..................... F16L 41/023
10,625,221 B2 * 4/2020 Schneider ............. B01F 35/561
2003/0223307 A1 * 12/2003 Nunez ................... B01F 23/405 366/144
2011/0282114 A1 11/2011 Luo et al.

FOREIGN PATENT DOCUMENTS

| | | | |
|---|---|---|---|
| CN | 201389431 | Y | 1/2010 |
| CN | 101695638 | A | 4/2010 |
| CN | 202173892 | U | 3/2012 |
| CN | 102939147 | A | 2/2013 |
| CN | 102946984 | A | 2/2013 |
| CN | 206121542 | U | 4/2017 |
| CN | 107519777 | A | 12/2017 |
| CN | 108014660 | A | 5/2018 |
| CN | 108194823 | A | 6/2018 |
| JP | H03296426 | A | 12/1991 |
| JP | H11500768 | A | 1/1999 |
| WO | 2004022208 | A1 | 3/2004 |
| WO | 2015010062 | A1 | 1/2015 |

OTHER PUBLICATIONS

English abstract for JPH03296426 , Total of 1 page.
English abstract for corresponding patent document JPH11500768 for U.S. Pat. No. 5,816,446 , Total of 1 page.
English abstract for WO2004022208, Total of 1 page.
Office Action for JP2020-006318, dated Dec. 21, 2020, Total of 3 pages.
Search report for TW108108287, dated Dec. 9, 2019, Total of 1 page.
Search report for CN201910225339.4, dated Mar. 21, 2022, Total of 2 pages.
English abstract for CN1218767, Total of 1 page.
English abstract for CN101695638, Total of 1 page.
English abstract for CN102946984, Total of 1 page.
English abstract for CN107519777, Total of 1 page.
English abstract for CN202173892, Total of 1 page.
Search report for CN201910225339.4, dated Oct. 26, 2021, Total of 2 pages.
English abstract for CN108014660, Total of 1 page.
English abstract for CN206121542, Total of 1 page.
English abstract for CN102939147, Total of 1 page.
English abstract for CN2786411, Total of 1 page.
English abstract for CN108194823, Total of 1 page.

* cited by examiner

FLUID MISING ASSEMBLY

BACKGROUND OF THE INVENTION

1. Technical Field

The present invention is related to a mixing assembly, and more particularly to a fluid mixing assembly.

2. Description of Related Art

In high-tech fields, there is a need to manufacture units of high-tech products, e.g., semiconductor chips, display devices, touch panels, by providing chemical solutions having a high purity and a stable concentration. It is needed to prepare such chemical solutions having a high purity and a stable concentration by consuming lots of deionized water to dilute a chemical liquid to a desired concentration.

For example, a chemical stock solution having a high concentration is generally diluted to a chemical solution having a lower concentration by a progressive method or a step-by-step method, so that if a chemical solution having a trace concentration, e.g., ppm level, is needed, lots of the deionized water has to be consumed. Furthermore, the abovementioned dilution method is used to prepare large amount of the chemical solution having a lower concentration in a single preparation, so that if all of said chemical solution cannot be consumed in a short period, the concentration of said prepared chemical solution would be changed, so as to decrease quality stability of the units of high-tech products.

The abovementioned dilution method includes the problem of consuming lots of deionized water to waste water and energy sources and consume lots of filter materials. In addition, said dilution method also includes problem of dilution of the chemical solution exactly to a chemical solution having a trace concentration, e.g., ppm level, so that manufacturing accuracy of the units of high-tech products would be restricted.

As abovementioned, current devices for diluting chemical solution is needed to be improved, so as to overcome such problems of the conventional devices for diluting chemical solution.

BRIEF SUMMARY OF THE INVENTION

In view of the above, the primary objective of the present invention is to provide a fluid mixing assembly, which can be applied to a dilution system for diluting chemical solution, e.g., a dilution system for diluting an ammonia solution, and the dilution system can keep the chemical solution having a desired concentration in a long period, whereby to increase quality stability of units of high-tech products.

The present invention provides a fluid mixing assembly including a connecting cap, a three-way pipe and a connecting member. The connecting cap has a first connecting portion. The three-way pipe is connected to the connecting cap, and has a second connecting portion, an output portion and a cavity, wherein the second connecting portion, the output portion and the cavity communicate with each other. The connecting member is connected to the connecting cap, and has a pin-hole channel, wherein the pin-hole channel has a first end bore and a second end bore opposite to the first end bore, the first end bore communicates with the first connecting portion, and the second end bore communicates with the second connecting portion and the output portion.

With the aforementioned design, the fluid mixing assembly provided in the present invention can be applied to a dilution system for diluting chemical solution, which makes the dilution system decreases a consumption of deionized water, and can dilute a chemical solution to a desired concentration through pressure control. Besides, for diluting to a trace concentration, e.g., ppm level, the fluid mixing assembly provided in the present invention can be injected a fluid, and makes the trace fluid mixing with a liquid, so that a diluted chemical solution can have a trace concentration of ppm level. Furthermore, the diluted chemical solution can keep having a desired concentration in a long period by the fluid mixing assembly provided in the present invention, whereby to increase quality stability of units of high-tech products.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
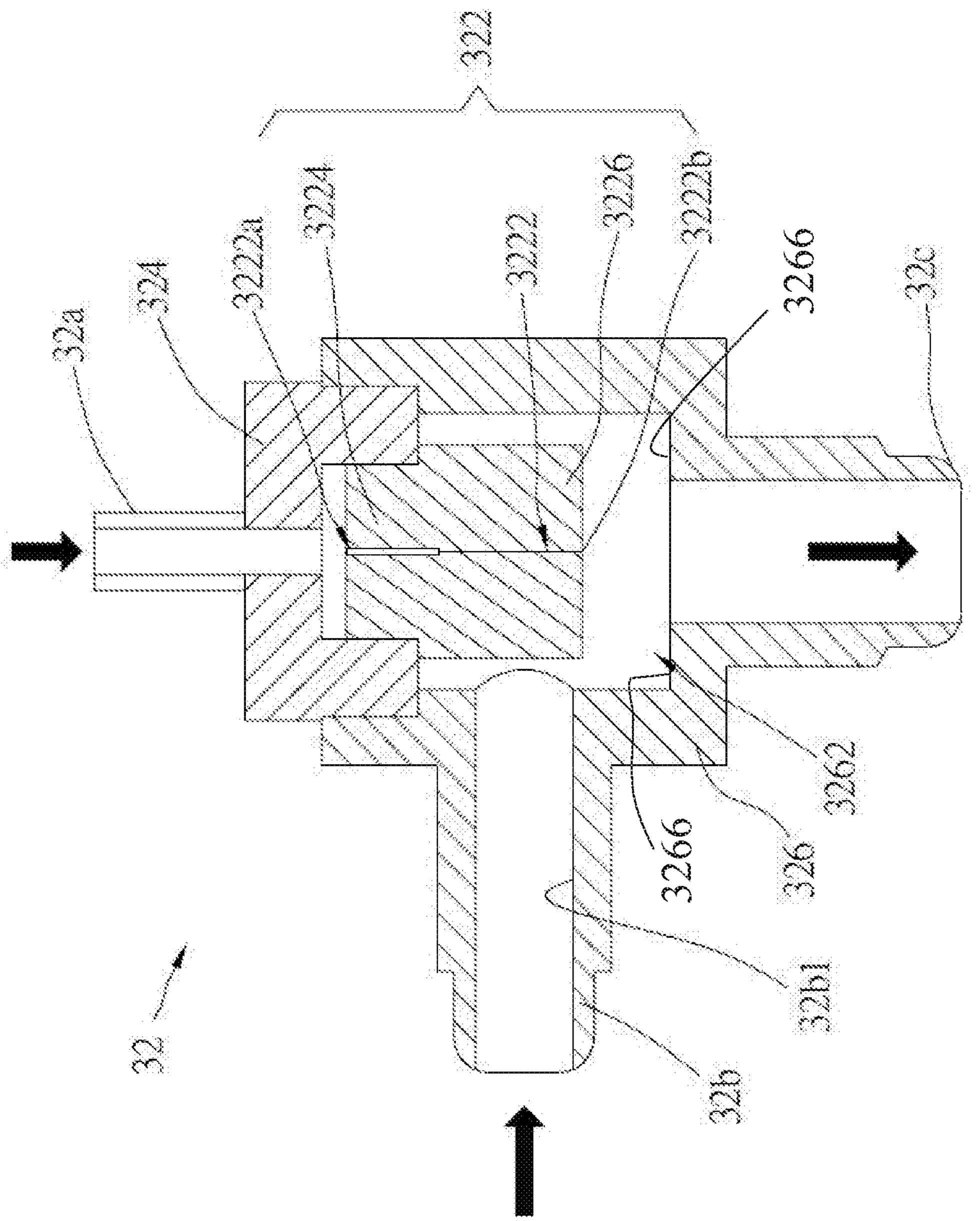
FIG. 1 is a cross-sectional view of a fluid mixing assembly in a first embodiment of the present invention.
Figure 2:
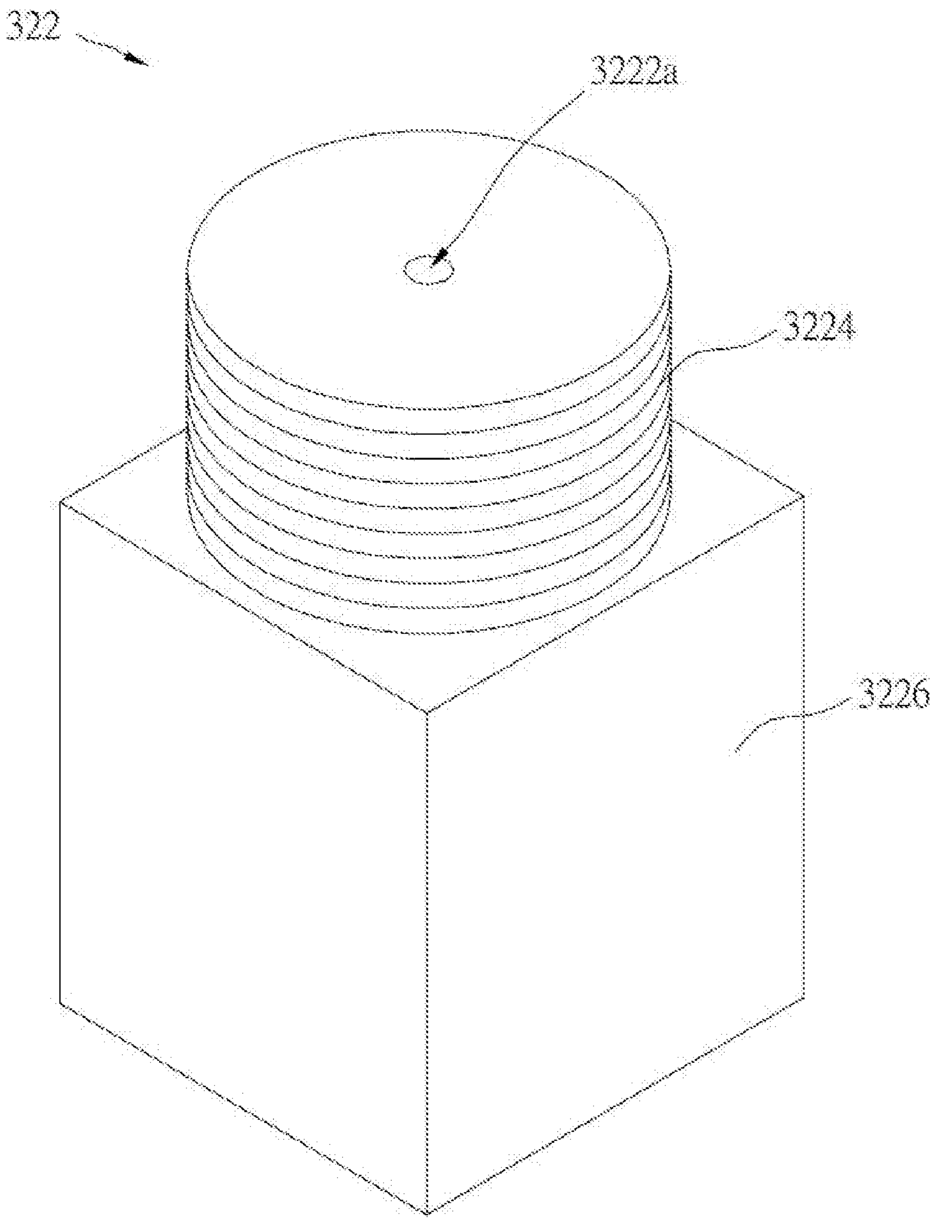
FIG. 2 is a perspective view of a connecting member in the first embodiment of the present invention.
Figure 3:
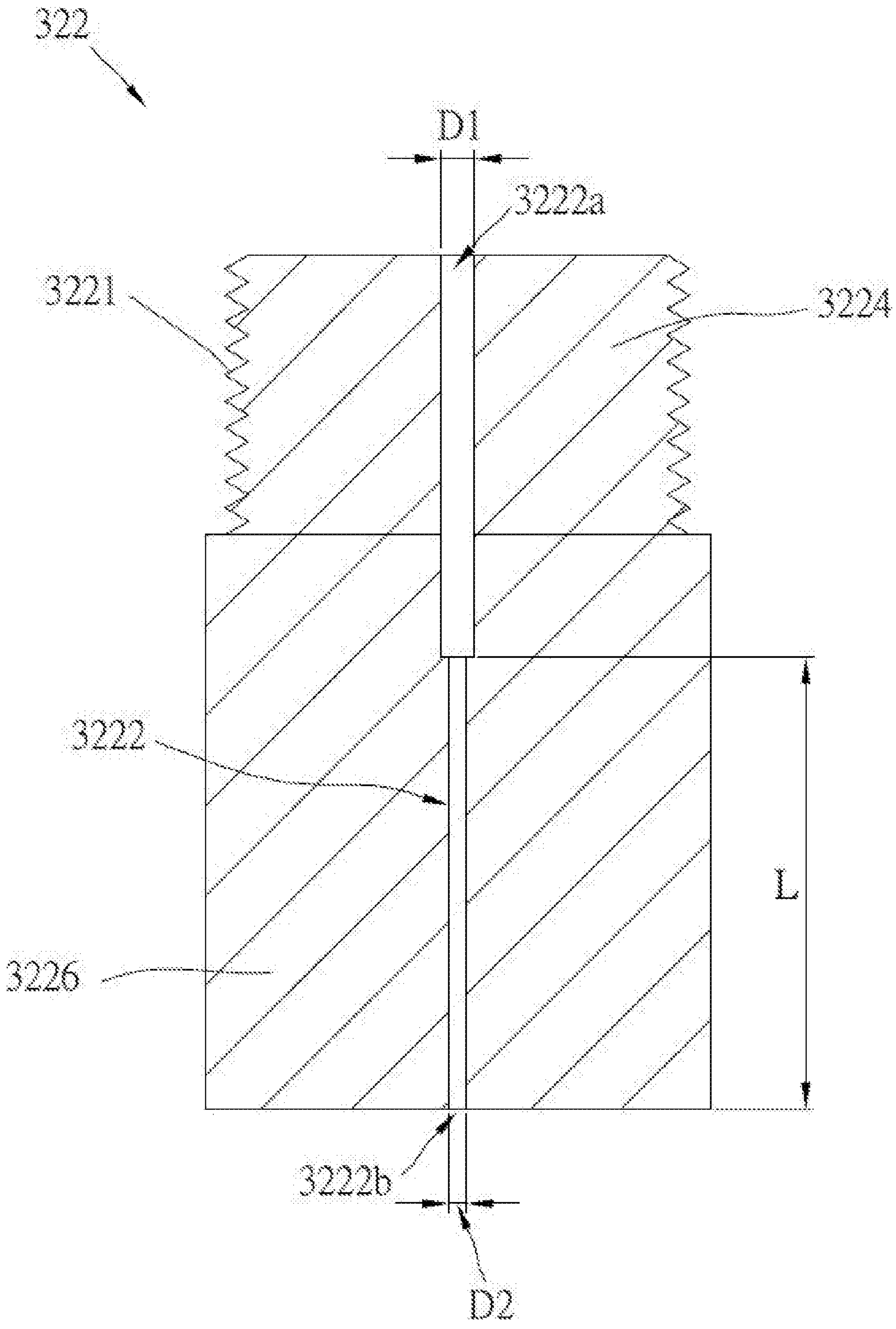
FIG. 3 is a cross-sectional view of the connecting member in the first embodiment of the present invention.
Figure 4:
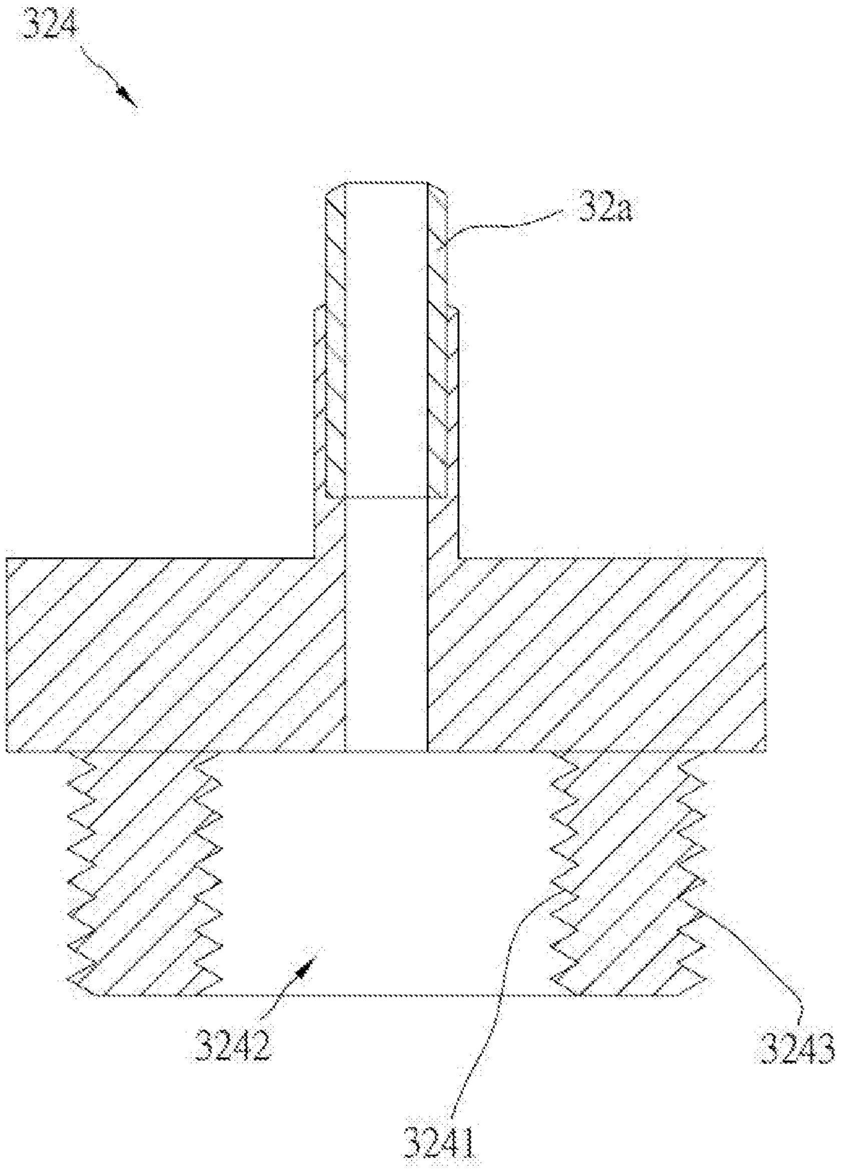
FIG. 4 is a cross-sectional view of a connecting cap in the first embodiment of the present invention.
Figure 5:
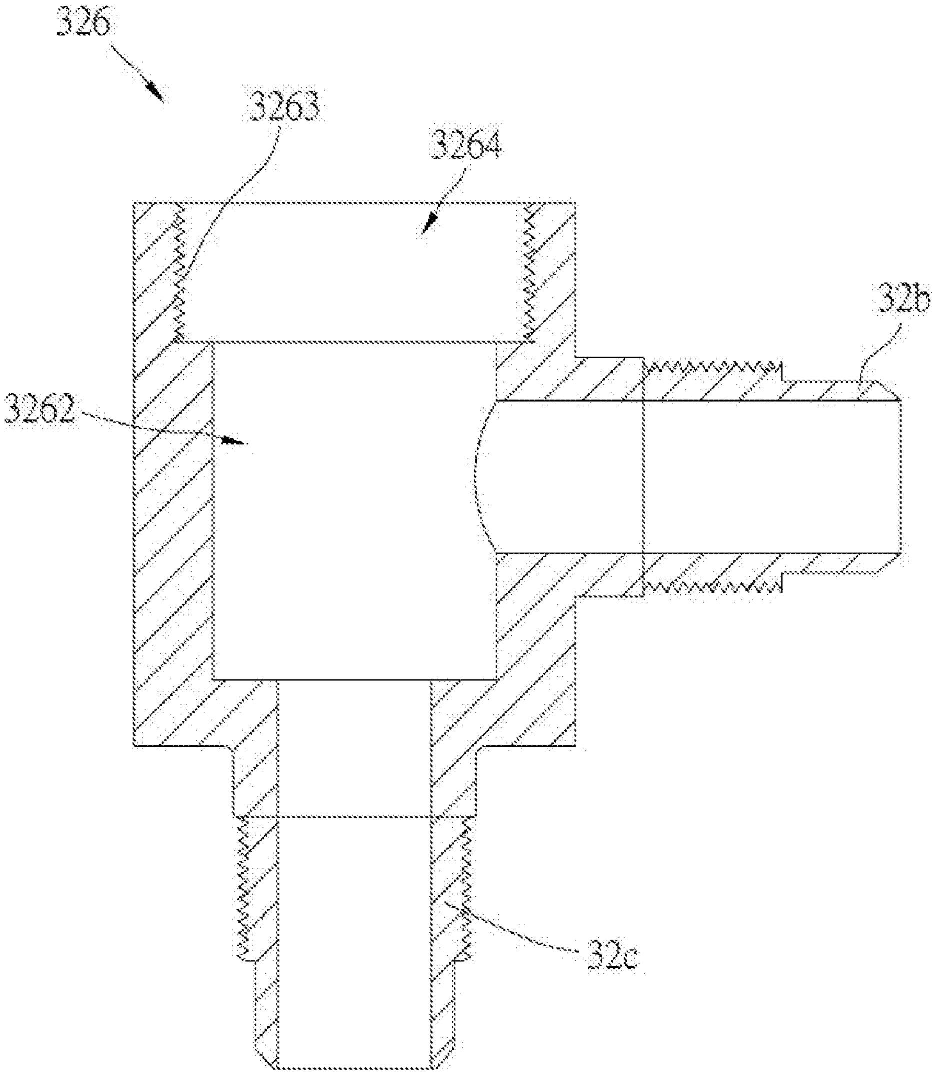
FIG. 5 is a cross-sectional view of a three-way pipe in the first embodiment of the present invention.

As illustrated in FIG. 1, FIG. 1 is a cross-sectional view of the fluid mixing assembly 32 in the first embodiment of the present invention, and the fluid mixing assembly 32 can be used to dilute ammonia solutions, but not limited thereto.

The fluid mixing assembly 32 includes a connecting member 322, a three-way pipe 326 and a connecting cap 324. The connecting cap 324 is respectively connected to the three-way pipe 326 and the connecting member 322, and a first connecting portion 32*a* is located on the connecting cap 324. The three-way pipe 326 has a second portion 32*b*, an output portion 32*c* and a cavity 3262, wherein the second connecting portion 32*b*, the output portion 32*c* and the cavity 3262 communicate with each other. The three-way pipe 326 has an inner bottom wall 3266 in the cavity 3262, and the output portion 32*c* is formed in the inner bottom wall 3266. In the first embodiment of the present invention, the inner bottom wall 3266 of the three-way pipe 326 has a level inner surface. Compared of tube sizes of the second portion 32*b* and the output portion 32*c*, a tube size of the output portion 32*c* is greater than or equals to that of the second portion 32*b*, whereby to prevent the cavity 3262 from accumulating pressure, so as to increase a controllability of fluids.

The connecting member 322 has a pin-hole channel 3222, an input end 3224 and an output end 3226, and a first end bore 3222*a* of the pin-hole channel 3222 communicates with the first connecting portion 32*a*, and a second end bore 3222*b* of the pin-hole channel 3222 communicates with the second connecting portion 32*b* and the output portion 32*c*. In the first embodiment of the present invention, the connecting member 322 is connected to the connecting cap 324 through the input end 3224, and the output 3226 of the connecting member 322 is positioned in the cavity 3262 of the three-way pipe 326. In the first embodiment of the present invention, a part of the connecting cap 324 is positioned between the connecting member 322 and the three-way pipe 326. In the first embodiment of the present invention, the second connecting portion 32*b* is vertical to the first connecting portion 32*a* and the output portion 32*c*, wherein the second connecting portion 32*b* is vertical to the first connecting portion 32*a*, and is vertical to the output portion 32*c*. In the first embodiment of the present invention, the first end bore 3222*a* of the pin-hole channel 3222 has a first bore size D1, and the second end bore 3222*b* has a second bore size D2, the first bore size D1 is greater than the second bore size D2. In the first embodiment of the present invention, the second bore size D2 is in a range of 0.01 mm to 0.1 mm, and is preferably in a range of 0.04 mm to 0.07 mm. In the first embodiment of the present invention, the pin-hole channel 3222 of the connecting member 322 has a length L in a range of 20 mm to 30 mm, and is preferably in a range of 23 mm to 27 mm Compared to two end of the pin-hole channel 3222, the channel portion of the pin-hole channel 3222 is a narrow channel, so that the pin-hole channel 3222 in the connecting member 322 can be used to dilute a fluid to a desired conductivity and a desired concentration through pressure differences from the first connecting portion 32*a* and the second connecting portion 32*b*.

In the first embodiment of the present invention, the pin-hole channel 3222 of the connecting member 322 meets the following equation:

$$Q = \frac{\pi d^4 g \Delta P}{128 v \gamma L}$$

wherein, Q is a flow rate of the fluid;

d is a second bore size of the pin-hole channel 3222;

L is a length of the pin-hole channel 3222;

ΔP is a pressure difference from the first connecting portion 32*a* and the second connecting portion 32*b* of the pin-hole channel 3222.

In view of the abovementioned equation, after manufacturing the fluid mixing assembly 32, d and L are constant, and in practice, the flow rate of the fluid flowing through the pin-hole channel 3222 can be adjusted through adjusting the pressure difference ΔP.

It's worthy to mention that, except for decreasing the pressure difference ΔP to a trace value, the ratio value of (d^4/L) can also be decreased, in order to perform a desired trace adjustment. In other words, if the ratio value of (d^4/L) is needed to be decreased, the second bore size D2 of the pin-hole channel 3222 would be decreased as less as possible, or the length L of the pin-hole channel 3222 would be increased as greater as possible. However, for the convenience in use and ease to adjust the pressure difference ΔP, the fluid mixing assembly 32 provided in the first embodiment of the present invention has a tiny second bore size D2, whereby to apply in a dilution system of a chemical solution having a trace concentration.

Referring to FIG. 2 to FIG. 5, the input end 3224 of the connecting member 322 is in a cylinder shape, and the connecting cap 324 has an inner round recess 3242, wherein the inner end 3224 of the connecting member 322 and the inner round recess 3242 of the connecting cap 324 are correspondingly connected to each other. In the first embodiment of the present invention, the input end 3224 of the connecting member 322 has an outer screw thread 3221, and the inner round recess 3242 of the connecting cap 324 has an inner screw thread 3241, and the input end 3224 and the inner round recess 3242 are screwed with each other through the combination of the outer screw thread 3221 and the inner screw thread 3241, but not limited thereto. In practice, the input end 3224 and the inner round recess 3242 can be connected to each other in other ways, e.g., turn buckle.

In the first embodiment of the present invention, the output end 3226 of the connecting member 322 is in a square column shape, but is not limited thereto; in practice, the output end 3226 of the connecting member 322 can be in a cylinder shape. In the first embodiment of the present invention, the output end 3226 of the connecting member 322 is corresponding to the second connecting portion 32*b* of the three-way pipe 326 by one corner or one surface of the square column, but not limited thereto; in practice, no matter one corner or one surface of the square column is corresponding to the second connecting portion 32*b* of the three-way pipe 326, the preparation result of chemical solution cannot be affected.

The connecting cap 324 has an outer round wall, and the three-way pipe 326 has an inner round opening 3264, the outer round wall of the connecting cap 324 and the inner round opening 3264 of the three-way pipe 326 are correspondingly connected to each other. In the first embodiment of the present invention, the outer round wall of the connecting cap 324 has an outer screw thread 3243, and the inner round opening 3264 of the three-way pipe 326 has an inner screw thread 3263, and the outer round wall and the inner round opening 3264 are screwed with each other through the combination of the outer screw thread 3243 and the inner screw thread 3263, but not limited thereto. In practice, the outer round wall and the inner round opening 3264 can be connected to each other in other ways, e.g., turn buckle.

In other embodiments of the present invention, the connecting member 322 and the three-way pipe 326 are formed integrally in one piece, which can be fixedly connected to the connecting cap 324. In the first embodiment of the present invention, the connecting member 322, the connecting cap 324 and the three-way pipe 326 are all formed of plastic materials in order to prevent metal materials from being rusted or contaminating said diluted chemical solution.

Figure 6:
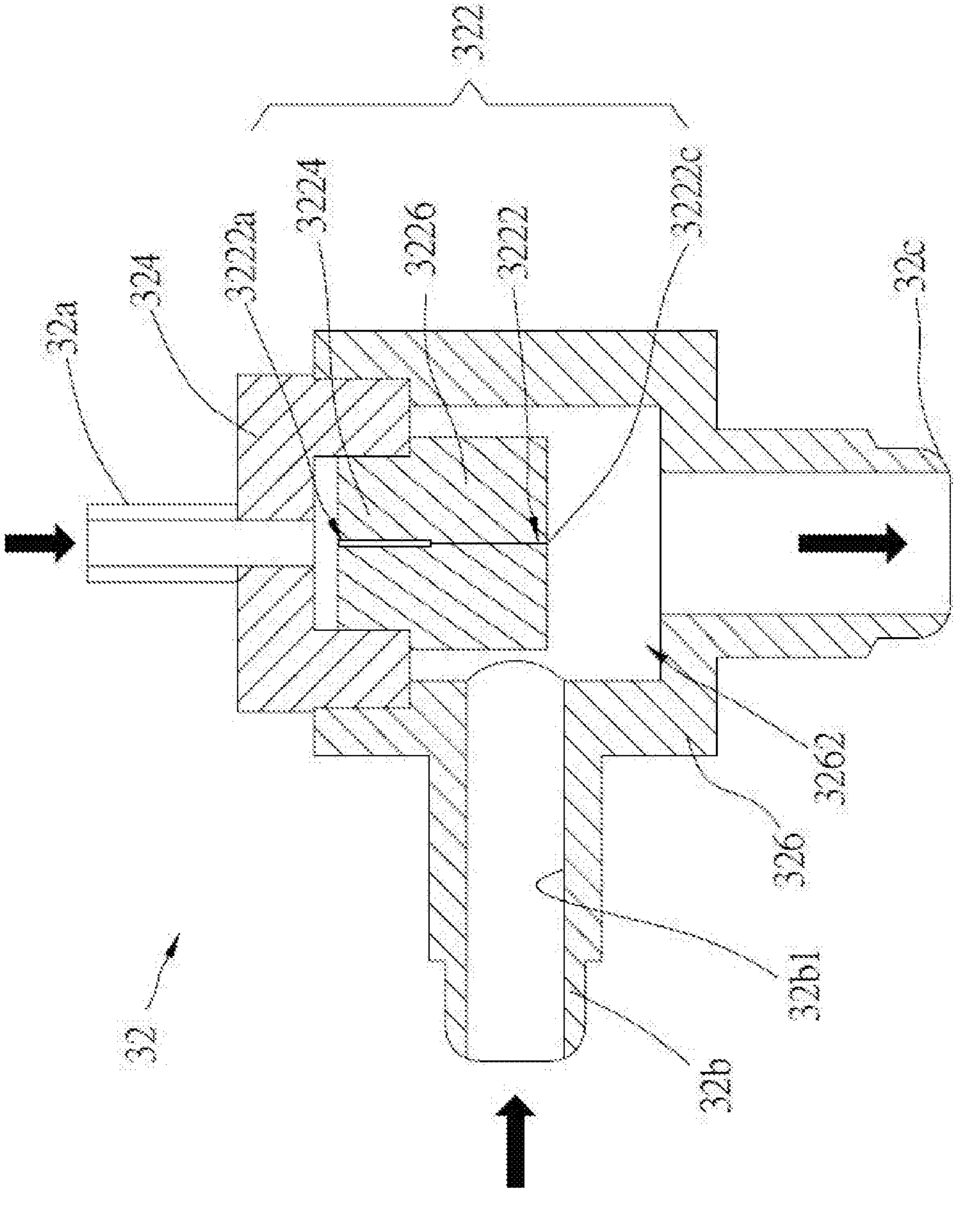
FIG. 6 is a cross-sectional view of a fluid mixing assembly in a second embodiment of the present invention.

FIG. 1 is a cross-sectional view of a fluid mixing assembly in a first embodiment of the present invention; FIG. 6 is a cross-sectional view of a fluid mixing assembly in a second embodiment of the present invention. In FIG. 1, the second end bore 3222*b* of the connecting member 322 is lower than a lowest position 32*b*1 of an inner channel in the second connecting portion 32*b*. In the present embodiment, the second end bore 3222*b* of the connecting member 322 is lower than a lowest position 32*b*1 of an inner channel in the second connecting portion 32*b*, so that a second fluid from the second connecting portion 32*b* cannot affect an output of a first fluid from the pin-hole channel 3222. Contrary to FIG. 1, in FIG. 6, the second end bore **3222*b* of the connecting member 322 is higher than a lowest position 32*b*1 of an inner channel in the second connecting portion 32*b*, so that the second fluid from the second connecting portion 32*b* would form a back pressure at the second end bore 3222*b* of the connecting member 322, whereby to affect an outflow of the first fluid from the pin-hole channel 3222**.

For example, if a diluted mixed fluid having a diluted concentration of 1 ppm in the first embodiment (FIG. 1) of the present invention, and the second fluid from the second connecting portion **32*b* has a pressure of 10 psi, the first fluid from the first connecting portion 32*a* through the pin-hole channel 3222 has a pressure of 20 psi. However, in the second embodiment (FIG. 6) of the present invention, the second fluid from the second connecting portion 32*b* would form the back pressure at the second end bore 3222*b* of the connecting member 322, and affects the outflow of the first fluid from the pin-hole channel 3222, so that if a diluted mixed fluid having a diluted concentration of 1 ppm in the second embodiment (FIG. 6) of the present invention, and the second fluid from the second connecting portion 32*b* has a pressure of 10 psi, the first fluid from the first connecting portion 32*a* through the pin-hole channel 3222 has a pressure which is needed to increase to 30 psi, in order to make the first fluid to outflow from the pin-hole channel 3222** smoothly.

As abovementioned, if diluted mixed fluids are prepared to have the same diluted concentration, compared to the first embodiment, there is needed to provide a greater pressure difference (ΔP) from the first connecting portion **32*a* and the second connecting portion 32*b*** of the fluid mixing assembly in the second embodiment.

Figure 7:
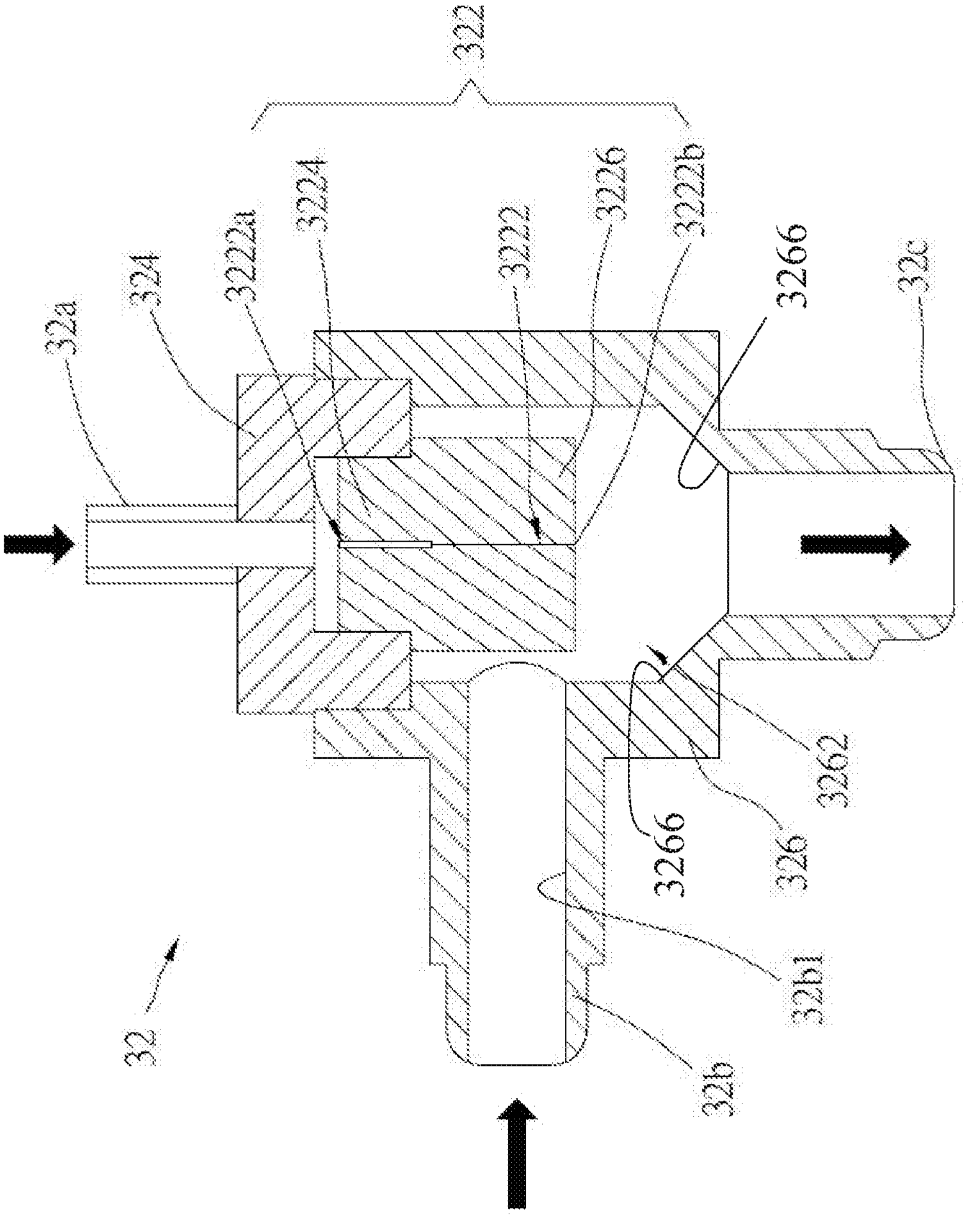
FIG. 7 is a cross-sectional view of a fluid mixing assembly in a third embodiment of the present invention.

FIG. 7 is a cross-sectional view of a fluid mixing assembly in a third embodiment of the present invention. Referring to FIG. 7, the three-way pipe 326 has an inner bottom wall 3266 in the cavity 3262, and the output portion **32*c* is formed in the inner bottom wall 3266. In the third embodiment of the present invention, the inner bottom wall 3266 of the three-way pipe 326 has a tilting inner surface. The tilting inner surface is formed in a funnel shape, the output portion 32*c* is located at a lowest position of the tilting inner surface. Whereby, in FIG. 7, the fluid flow from the second connecting portion 32*b* inlets into the cavity 3262, and the fluid flow in the cavity 3262** can form a vortex flow. In the present embodiment, the vortex flow can outlet in the forward direction, which can avoid from generating turbulent flows that may squeeze the pinhole and affect the fluid flow.

Figure 8:
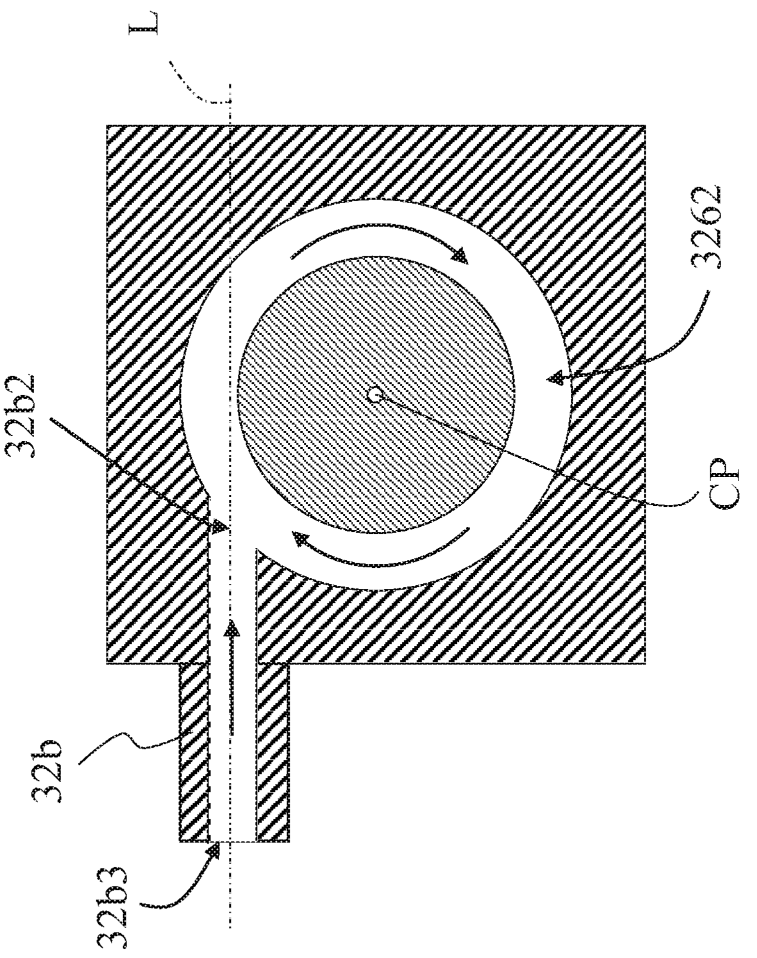
FIG. 8 is a cross-sectional view of a fluid mixing assembly in a fourth embodiment of the present invention.

FIG. 8 is a cross-sectional view of a fluid mixing assembly in a fourth embodiment of the present invention. Referring to FIG. 8, the second connecting portion **32*b* has a first end hole 32*b*2 and a second end hole 32*b*3, the second connecting portion 32*b* communicates with the cavity 3262 through the first end hole 32*b*2. In the fourth embodiment of the present invention, the second connecting portion 32*b* has a straight extension line L passing through the first end hole 32*b*2 and the second end hole 32*b*3, and the straight extension line L does not pass through a center point CP of the cavity 3262. Whereby, in FIG. 8, the fluid flow from the second connecting portion 32*b* inlets into the cavity 3262, and the fluid flow in the cavity 3262** can form a vortex flow. In the present embodiment, the vortex flow can outlet in the forward direction, which can avoid from generating turbulent flows that may squeeze the pinhole and affect the fluid flow.

Figure 9:
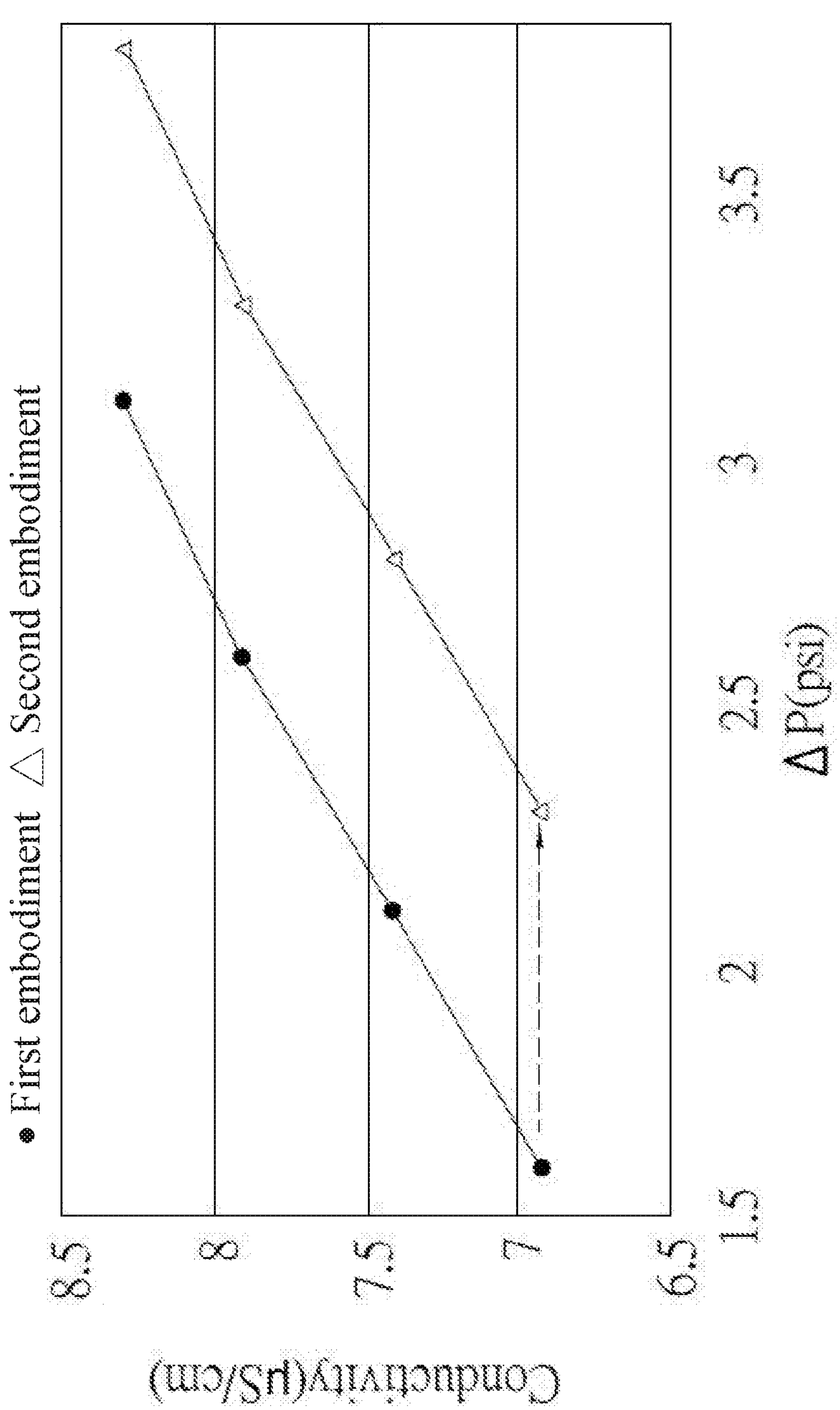
FIG. 9 is a chart of pressure differences to conductivities of ammonia solutions.

FIG. 9 is a chart of pressure differences to conductivities of ammonia solutions. In FIG. 9, the left line (●) shows pressure differences to conductivities of ammonia solutions in the first embodiment, and the right line (Δ) shows pressure differences to conductivities of ammonia solutions in the second embodiment. As shown in FIG. 9, under the same conductivity of ammonia solutions, the pressure differences in the second embodiment are greater than the pressure differences in the first embodiment; however, the fluid mixing assembly, liquid pipes and several pipe joints respectively have their maximum values of pressure resistance, wherein the pressure difference from the first connecting portion **32*a* and the second connecting portion 32*b* has its maximum value, so that the concentration range of the diluted mixed fluid in the fluid mixing assembly of the second embodiment (FIG. 6) is less than that in the fluid mixing assembly of the first embodiment (FIG. 1**).

It's worthy to mention that, although the concentration range of the diluted mixed fluid in the fluid mixing assembly of the second embodiment (FIG. 6) is less, in the present invention, the fluid mixing assembly provided in the second embodiment is still suitable for applying in a dilution system of chemical solutions and mixing a trace fluid and a liquid to prepare a diluted chemical solution having a trace concentration of ppm level.

According to embodiments of the present invention, with the aforementioned design, the fluid mixing assembly provided in the present invention can be applied to a dilution system for diluting chemical solution, which makes the dilution system decreases a consumption of deionized water, and can dilute a chemical solution to a desired concentration through pressure control. Besides, for diluting to a trace concentration, e.g., ppm level, the fluid mixing assembly provided in the present invention can be injected a fluid, and makes the trace fluid mixing with a liquid, so that a diluted chemical solution can have a trace concentration of ppm level. For example, the dilution system and method for diluting chemical solutions provided in the present invention can immediately prepare 2~3 ppm functional water (e.g., aqueous ammonia), which can be used for cleaning wafers, so there is no need to waste a lot of deionized water to prepare excessive diluted chemical solutions. Furthermore, the diluted chemical solution can keep having a desired concentration in a long period by the fluid mixing assembly provided in the present invention, whereby to increase quality stability of units of high-tech products.

It must be pointed out that the embodiments described above are only some preferred embodiments of the present invention. All equivalent structures which employ the concepts disclosed in this specification and the appended claims should fall within the scope of the present invention.

What is claimed is:

1. A fluid mixing assembly, comprising:

a connecting cap having a first connecting portion;

a three-way pipe connected to the connecting cap, and having a second connecting portion, an output portion and a cavity, wherein the second connecting portion, the output portion and the cavity communicate with each other; and a connecting member directly and mechanically connected such that portions of the connecting member are abutted to the connecting cap, and having a pin-hole channel, wherein the pin-hole channel has a first end bore and a second end bore opposite to the first end bore, the first end bore communicates with the first connecting portion, and the second end bore communicates with the second connecting portion and the output portion;

wherein a part of the connecting cap is positioned between the connecting member and the three-way pipe in a radial direction of the pin-hole channel;

wherein the first end bore of the pin-hole channel has a first bore size, and the second end bore has a second bore size, the first bore size is greater than the second bore size;

wherein the second bore size is in a range of 0.01 mm to 0.1 mm.

2. The fluid mixing assembly of claim 1, wherein the connecting member further comprises an input end and an output end opposite to the input end, the first end bore of the pin-hole channel is located at the input end, and the second end bore thereof is located at the output end, the connecting member is connected to the connecting cap at the input end, and the output end of the connecting member is positioned in the cavity of the three-way pipe.

3. The fluid mixing assembly of claim 1, wherein the second connecting portion is vertical to the first connecting portion and the output portion.

4. The fluid mixing assembly of claim 1, wherein the second bore size is in a range of 0.04 mm to 0.07 mm.

5. The fluid mixing assembly of claim 1, wherein the input end of the connecting member is in a cylinder shape, and the connecting cap has an inner round recess, the inner end of the connecting member and the inner round recess of the connecting cap are correspondingly connected to each other.

6. The fluid mixing assembly of claim 1, wherein the connecting cap has an outer round wall, and the three-way pipe has an inner round opening, the outer round wall of the connecting cap and the inner round opening of the three-way pipe are correspondingly connected to each other.

7. The fluid mixing assembly of claim 1, wherein the connecting member and the three-way pipe are formed integrally in one piece.

8. The fluid mixing assembly of claim 1, wherein the three-way pipe has an inner bottom wall in the cavity, and the output portion is formed in the inner bottom wall.

9. The fluid mixing assembly of claim 8, wherein the inner bottom wall of the three-way pipe has a level inner surface or a tilting inner surface.

10. The fluid mixing assembly of claim 9, wherein the tilting inner surface is formed in a funnel shape, the output portion is located at a lowest position of the tilting inner surface.

11. The fluid mixing assembly of claim 1, wherein the second connecting portion has a first end hole and a second end hole, the second connecting portion communicates with the cavity through the first end hole; the second connecting portion has a straight extension line passing through the first end hole and the second end hole, and the straight extension line does not pass through a center point of the cavity.

* * * * *